US009202233B1

(12) United States Patent
Siegel et al.

(10) Patent No.: US 9,202,233 B1
(45) Date of Patent: Dec. 1, 2015

(54) EVENT ATTENDANCE DETERMINATIONS

(75) Inventors: Hilliard Bruce Siegel, Seattle, WA (US);
Francis J. Kane, Sammamish, WA (US);
Alexandre Edelman, Seattle, WA (US);
George E. Rabatin, III, Seattle, WA (US); Justin M. Campbell, Seattle, WA (US); Adam Carlson, Seattle, WA (US);
Andrej Gregov, Seattle, WA (US)

(73) Assignee: IMDb.com, Inc., Seattle, WA (US)

( * ) Notice: Subject to any disclaimer, the term of this patent is extended or adjusted under 35 U.S.C. 154(b) by 954 days.

(21) Appl. No.: 12/895,650

(22) Filed: Sep. 30, 2010

(51) Int. Cl.
*G06Q 30/00* (2012.01)
*G06Q 30/02* (2012.01)

(52) U.S. Cl.
CPC ........ *G06Q 30/0252* (2013.01); *G06Q 30/0261* (2013.01); *G06Q 30/0264* (2013.01); *G06Q 30/0251* (2013.01)

(58) Field of Classification Search
USPC ........................................................ 705/14.5
See application file for complete search history.

(56) References Cited

U.S. PATENT DOCUMENTS

| 6,912,398 B1* | 6/2005 | Domnitz ....................... 455/461 |
| 7,487,112 B2* | 2/2009 | Barnes, Jr. .................... 705/26.8 |
| 2004/0260605 A1* | 12/2004 | McIntyre et al. ............... 705/14 |
| 2007/0156539 A1* | 7/2007 | Yates ............................. 705/26 |
| 2008/0189360 A1* | 8/2008 | Kiley et al. .................... 709/203 |
| 2008/0195312 A1* | 8/2008 | Aaron et al. ................... 701/209 |
| 2009/0286553 A1* | 11/2009 | Northway et al. .......... 455/456.3 |

OTHER PUBLICATIONS

Horvitz et al., "Coordinate: probabilistic forecasting of presence and availability", Proceedings of the Eighteenth conference on Uncertainty in Artificial Intelligence, Morgan Kaufman Publishers, Inc., 2002, pp. 224-233.*
"The Search for Entertainment", Yahoo!®, 2007, found on line at us.i1.yimg.com/us.yimg.com/i/us/ayc/pdf/aa_insights_searchent. pdf.*

* cited by examiner

*Primary Examiner* — John G Weiss
*Assistant Examiner* — Scott C Anderson
(74) *Attorney, Agent, or Firm* — Hogan Lovells US LLP

(57) ABSTRACT

Systems and methods are provided for determining the likelihood of a user's attendance at an event. For example, the systems and methods can be used to determine that a particular user is attending, is planning to attend, has already attended, or is about to attend a particular event, such as a movie, concert, tour, etc. Further, upon determining that a user is attending, has already attended, or is about to attend an event, systems and methods can be used to serve to a device, associated with the user, content that is related to the event. For example, the content may include invites that invite the user to provide a review of the event and to join a discussion about the event. Further, for example, the content may include links to websites that provide reviews and other information about the event, provide information about related events, or that offer related items for sale.

22 Claims, 5 Drawing Sheets

EVENT ATTENDANCE DETERMINATIONS

BACKGROUND

Internet users often research events online to inform their decisions of which event or events to attend. For example, a user may access a website that publishes movie-related information in order to browse movie reviews, theater locations, and show times. Using information gleaned from the website, the user may decide to attend a particular movie at a particular theater at a particular time.

There typically is no way for the publisher of the website and/or its affiliates to know which movie and show time the user chose to view or which theater the user chose to view the movie in. The publisher of the website thus cannot tailor content in light of the user's selection and serve that content to the user before, while, and/or after the user attends the movie. For example, the publisher cannot determine whether to prompt or remind the user to provide a review of the movie, or whether to provide the user with movie reviews of other users who attended the movie at the same theater. Unless the user purchases tickets via the website or otherwise explicitly indicates attendance at a particular movie, the publisher has no way of knowing which movie the user selected to attend.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of numbers is for purposes of simplicity of explanation and understanding, and should not be viewed as a limitation on the various embodiments.

DETAILED DESCRIPTION

Figure 1:
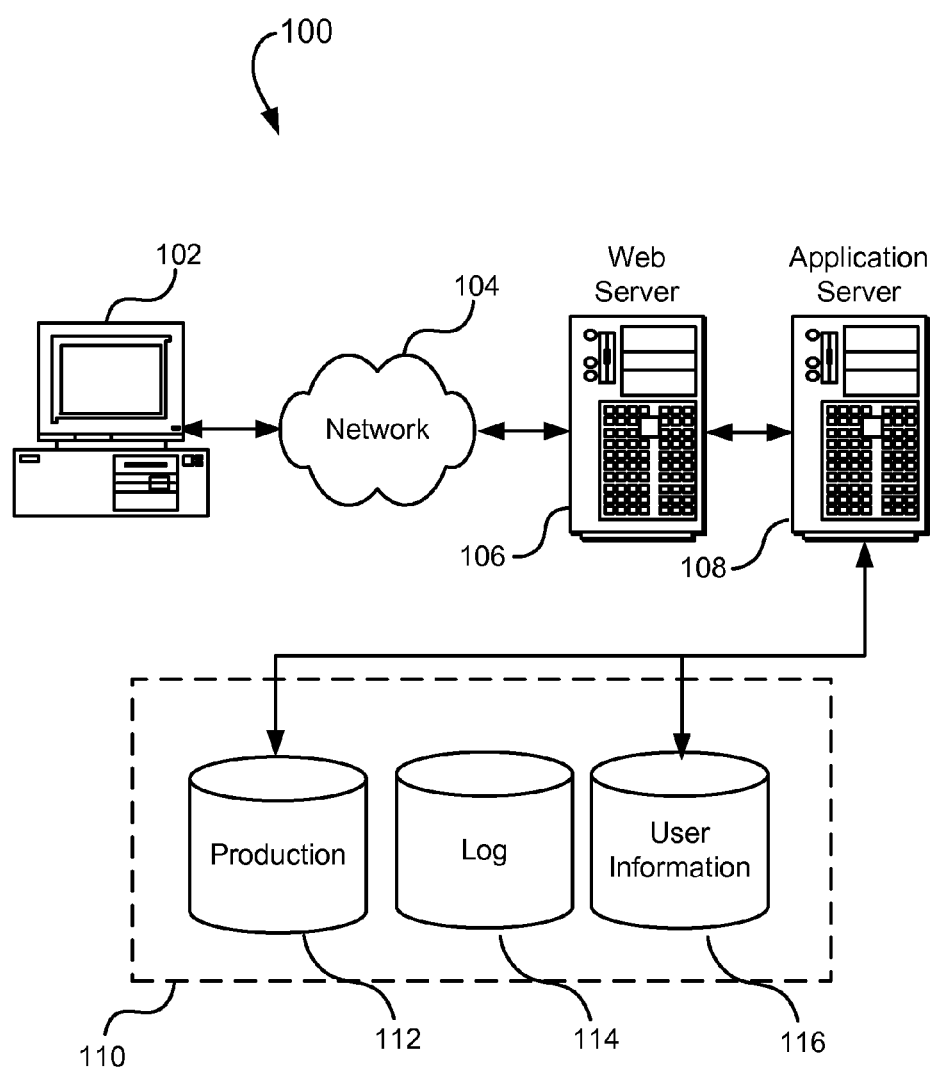
FIG. 1 is a schematic diagram illustrating an environment for implementing aspects, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Systems and methods are provided for determining the likelihood of a user's attendance at an event or other such occurrence. For example, various systems and methods can be used to determine that a particular user is likely attending, has already attended, or is about to attend a particular event, such as a movie, concert, tour, lecture, and so on. Further, upon determining that a user is attending, has already attended, or is about to attend an event, systems and methods can be used to serve to a device, associated with the user, content that is related to the event. For example, the content may include links that the user may select to provide a review of the event and/or join a discussion about the event. In addition, the content may include links to websites that, for example, provide reviews and other information about the event, provide information about related events, or that offer related items for sale. Further, for example, content could be invitations to attend events, coupons, recommendations for other events that may be of interest, etc. Various other options can be provided based upon the determined attendance of a user with respect to a particular event, series of events, type of event, etc.

It will be helpful to have a brief overview of example systems and methods for determining the likelihood of a user's attendance at an event. According to one example, data indicative of the user's interaction with a website or application is obtained. The website or application may provide content related to upcoming or previous events. For example, the obtained data may indicate that a user viewed general information about a particular event, that the user viewed, edited, or provided one or more reviews of the event, that the user viewed location and time-of-occurrence information for the event, that the user viewed promotional content related to the event, etc.

Next, the example systems and methods obtain information related to the one or more events implicated by the user's interaction with the website or application. For example, the systems and methods may obtain time and date information for when the one or more events occurred, or will occur, and location information for where the one or more events occurred, or will occur. After obtaining event information such as date, time, and location information for the one or more events, the example systems and methods obtain location and corresponding information (e.g., date, time, and location information) for the user. According to an example, the systems and methods obtain global positioning system (GPS) data associated with the user's mobile device. For example, the systems and methods may provide an opt-in service for which the user enables the systems and methods to obtain location information, such as GPS data, associated with the user's mobile device. It should be appreciated, however, that various other mechanisms for determining user location can be utilized as well within the scope of the various embodiments. For example, user location may also be determined based on proximate Wi-Fi networks, triangulation with cell phone towers, and the IP address information.

Next, the example systems and methods determine whether the user is/was physically located at or near the location of the event during a certain time period that includes the event based in part on the obtained location, time, and date information of the event and the user. For example, if the user is on his or her way to the event, the data may indicate that the user is at a location near the event, or following a route towards the event, just before the start of the event (e.g., within an appropriate time window). If the user is at the event, the data may indicate that the user is attending the event. Further, if the obtained data indicates that the user's location overlapped with the location of the event during at least a portion of time that the event occurred, the system may conclude that the user attended the event.

In some embodiments, the systems and methods determine confidence values and apply the confidence values to determine the likelihood that its conclusion (e.g., the user will attend an event, the user is attending an event, or the user did attend an event) is correct. To do so, the systems and methods obtain the time at which the user action occurred. As mentioned above, the user action may be user action with a website or application that provides content related to the event. The example systems and methods obtain the user's location and time of location, and the time of the event associated with the user interaction. Using this information, the systems and methods determine a difference between the time the user action occurred and the time the user was located near the event. If the time difference is relatively small, then the confidence value is relatively large. However, if the time difference is relatively large, then the confidence value is relatively small. This is because users are more likely to forget about the event, change their plans, or encounter a scheduling conflict as more time lapses between their initial user action involving the event and the time of the event. Larger confidence values in at least certain embodiments result in stronger likelihoods of attendance than smaller confidence values. It should be understood that other values, thresholds, and other such determinations can be used as well with other examples.

Based on the confidence value and what type of determination is made (e.g., the user is about to attend an event, user is attending an event or user has attended the event), the systems and methods select the appropriate content to send to the user. The content may be served directly to an application running on the user's mobile device, or another device associated with the user. In another example, the content may be served to an online account that the user accesses when reviewing information about events. For example, if the confidence value associated with the system's conclusion is relatively high and the data indicates that the user already attended the event, the content may include an invitation for the user to provide a review of the event. However, if the confidence value associated with the conclusion that the user already attended the event is moderate or relatively low, the content may include a link to an online merchant that sells items related to the event. The user's interaction with the content may be used to further refine the confidence value. For example, if an invite to provide a review of an event is sent to the user even though the confidence score is moderate and the user provides a review of the event, the confidence value may be increased. However, if, instead of providing a review, the user reads reviews provided by other users and then accesses location and time information for the event, then the confidence value that the user already attended the event is decreased.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers (PCs), cell phones, mobile phones, smart phones, third generation (3G) phones, touch-screen phones, handheld messaging devices, netbooks, computers incorporating touch-screens, tablet PCs, laptop computers, set-top boxes, personal data assistants (PDAs), electronic book readers, and the like. The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
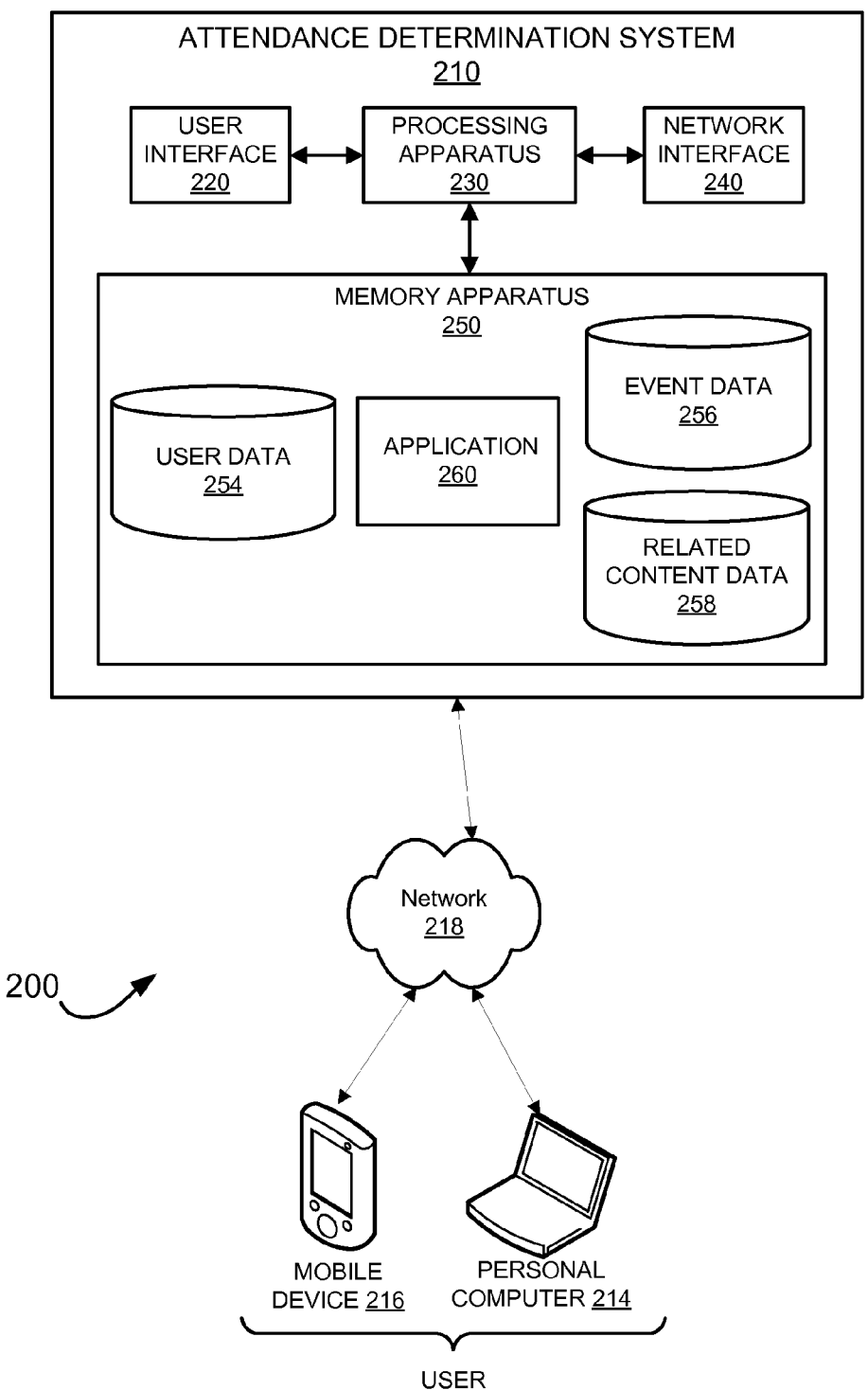
FIG. 2 is a block diagram depicting aspects of a system, in accordance with at least one embodiment.

It will be helpful to refer to an example system configured for determining the likelihood of a user's attendance at an event. FIG. 2 provides a block diagram of a attendance determination environment 200, in accordance with one embodiment. The attendance determination environment 200 generally includes a attendance determination system 210 in communication with a personal computer 214 and a mobile device 216, such as a GPS enabled device or any other type of location-aware device, associated with a consumer via a network 218. The attendance determination system 210 comprises a user-interface apparatus 220, a network-interface apparatus 240, and a memory apparatus 250 operatively coupled to a processing apparatus 230.

As described in greater detail below, embodiments of the attendance determination system 200 are generally configured to determine the likelihood that a particular user is attending, has already attended, or is about to attend a particular event, such as a movie, concert, tour, etc. Further, upon determining that a user is likely attending, has already attended, or is about to attend an event, the attendance determination system 210 is configured to serve to a device, such as the mobile device 216 and the personal computer 214 associated with the user content that is related to the event. It should be appreciated that the personal computer 214 may include any type of computing device, such as an electronic book reader, a tablet, a smartphone, a laptop, a desktop, etc. For example, the content may include links that invite the user to provide a review of the event and to join a discussion about the event. Further, for example, the content may include links to websites that provide reviews and other information about the event, provide information about related events, or that offer related items for sale.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art in light of the present description that, although FIG. 2 illustrates the user interface 220, network interface 240, memory apparatus 250, and processing apparatus 230 as separate blocks in the block diagram, these separations may be merely conceptual. In other words, in some instances, the user interface 220, for example, is a separate and distinct device from the processing apparatus 230 and the memory apparatus 250 and therefore may have its own processor, memory, and software. In other instances, however, the user interface 220 is directly coupled to or integral with at least one part of the processing apparatus 230 and at least one part of the memory apparatus 250 and includes the user interface input and output hardware used by the processing apparatus 230 when the processing apparatus 230 executes user input and output software stored in the memory apparatus 250.

As will be described in greater detail below, in one embodiment, the attendance determination system 210 is entirely contained within a user terminal, such as a personal computer or mobile terminal, while, in other embodiments, the attendance determination system 210 includes a central computing system, one or more network servers, and one or more user terminals in communication with the central computing system via a network and the one or more network servers. FIG. 2 is intended to cover both types of configurations as well as other configurations that will be apparent to one of ordinary skill in the art in view of this disclosure.

The user interface 220 includes hardware and/or software for receiving input into the attendance determination system 210 from a user and hardware and/or software for communicating output from the attendance determination system 210 to a user via, for example, the mobile device 216, the personal computer 214, and/or the user interface 220. In some embodiments, the user interface 220 includes one or more user input devices, such as a keyboard, keypad, mouse, microphone, touch screen, touch pad, controller, and/or the like. In some embodiments, the user interface 220 includes one or more user output devices, such as a display (e.g., a monitor, liquid crystal display, one or more light emitting diodes, etc.), a speaker, a tactile output device, a printer, and/or other sensory devices that can be used to communicate information to a person.

In some embodiments, the network interface 240 is configured to receive electronic input from other devices in the network 218, including the mobile device 216 and the personal computer 214 of the user. Further, the network interface 240 is configured to receive electronic input from other devices in the network 104, including the data store 110. In some embodiments, the network interface 240 is further configured to send electronic output to other devices in a network.

The processing apparatus 230 includes circuitry used for implementing communication and logic functions of the attendance determination system 210. For example, the processing apparatus 230 may include a digital signal processor device, a microprocessor device, and various analog-to-digital converters, digital-to-analog converters, and other support circuits. Control and signal processing functions of the attendance determination system 210 are allocated between these devices according to their respective capabilities. The processing apparatus 230 may include functionality to operate one or more software programs based on computer-readable instructions thereof, which may be stored in the memory apparatus 250. As described in greater detail below, in one embodiment the memory apparatus 250 includes an application 260 stored therein for instructing the processing apparatus 230 to perform one or more operations of the procedures described herein and in reference to FIGS. 3-5. Some embodiments may include other computer programs stored in the memory apparatus 250.

In general, the memory apparatus 250 is communicatively coupled to the processing apparatus 230 and includes at least one non-transitory computer-readable storage medium for storing computer-readable program code and instructions, as well as data stores containing data and/or databases. More particularly, the memory apparatus 250 may include volatile memory, such as volatile Random Access Memory (RAM), including a cache area for the temporary storage of data. The memory apparatus 250 may also include non-volatile memory that can be embedded and/or may be removable. The non-volatile memory can, for example, comprise an EEPROM, flash memory, or the like. The memory apparatus 250 can store any of a number of pieces of information and data used by the attendance determination system 210 to implement the functions of the attendance determination system 210 described herein.

In the illustrated embodiment, the memory apparatus 250 includes data stores containing user data 254, event data 256, and related content data 258. According to some embodiments, user data 254 includes information about individual users. For example, in some embodiments, the user data 254, for each user, provides location information obtained from the mobile device 216 associated with the user. For example, the location information may also include a corresponding timestamp, which provide the date and time the mobile device 216 was located at a location. According to some embodiments, the user data 254 also includes profile information for each user. For example, the user may have an online account with a publisher of content related to events that interest the user. The user may setup a user profile with the online account. In the profile, a user may store the user's event preferences, such as particular types of events (e.g, movies, concerts, artists, intellectuals, speakers, performers, etc.) and venues (theaters, stadiums, churches, etc.) that interest the user as well as geographical locations (e.g., cities, regions, etc.) where the user prefers to attend events. The user may access the online account to update the profile information via a web browser or some other type of application that runs on the mobile device 216 or personal computer 214. Further, for example, the user data 254 includes user action data related to actions the user takes on the website or application that provides content related to events that interest the user. For example, user action data may include a description of the user action (e.g., view show times, read or write reviews, purchase related items, etc.) and the corresponding time of the user action. Further, for example, the user data 254 may include training data, which can be used to predict whether the user will attend an event after certain types of user actions taken by the user on the website or application that provides content related to events that interest the user. For example, the training data may include information that indicates the user is likely to attend a movie two to three hours after the combined user action of reading a review of the movie and then checking show times for the movie, but that the user is unlikely to attend a movie after the user action of reading movie reviews but not checking show times.

According to some embodiments, the event data 256, for each event, comprises location information and corresponding times-of-occurrence. For example, for each event, the event data 256 may include a reference to the event (e.g., event title) along with location information of the venue where the event occurred, is occurring, or will occur and corresponding times-of-occurrence. For example, if the event is a movie, the event data 256 may include the title of the movie, location information of the theaters where the movie is being shown, and the show times at each of the locations.

According to some embodiments, the related content data 258 comprises content that is related to events. For example, upon determining which event a user is about to attend, is attending, or just attended, content related to the event is sent to the user via the mobile device 216 or the personal computer 214. The content may include, for example, links that invite the user to provide a review of the event and to join a discussion about the event. Further, for example, the content may include links to websites that provide reviews and other information about the event, provide information about related events, or that offer related items for sale.

For the sake of clarity and ease of description, the figures provided herein generally illustrate the user data 254, event data 256, and the related content data 258 as each being separate from one another. However, it will be understood that, in some embodiments, these data stores may be combined or the data described as being stored within such data stores may be further separated into additional data stores. For example, the event data 256 may include the related content data 258.

In one embodiment, data within user data 254 shown in FIG. 2 may be linked to, and thus organized around, a unique identification stored in the memory apparatus 250. In such case, unique identifications may be assigned to each of the users and the data within the user data 254 may be associated with these unique identifications. Also, according to an embodiment, data within the event data 256 and the related content data 258 may be linked to, and thus organized around, a unique identification stored in the memory apparatus 250. In such case, unique identifications may be assigned to each of the events and the data within the event data 256 and the related content data 258 may be organized around the unique identifications.

As further illustrated by FIG. 2 and as briefly mentioned above, the memory apparatus 250 also includes the application 260. As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, the application 260 includes computer-readable instructions for instructing the processing apparatus 230 and/or other devices to perform one or more of the functions described herein, such as one or more of the functions described in FIGS. 3-5.

Figure 3:
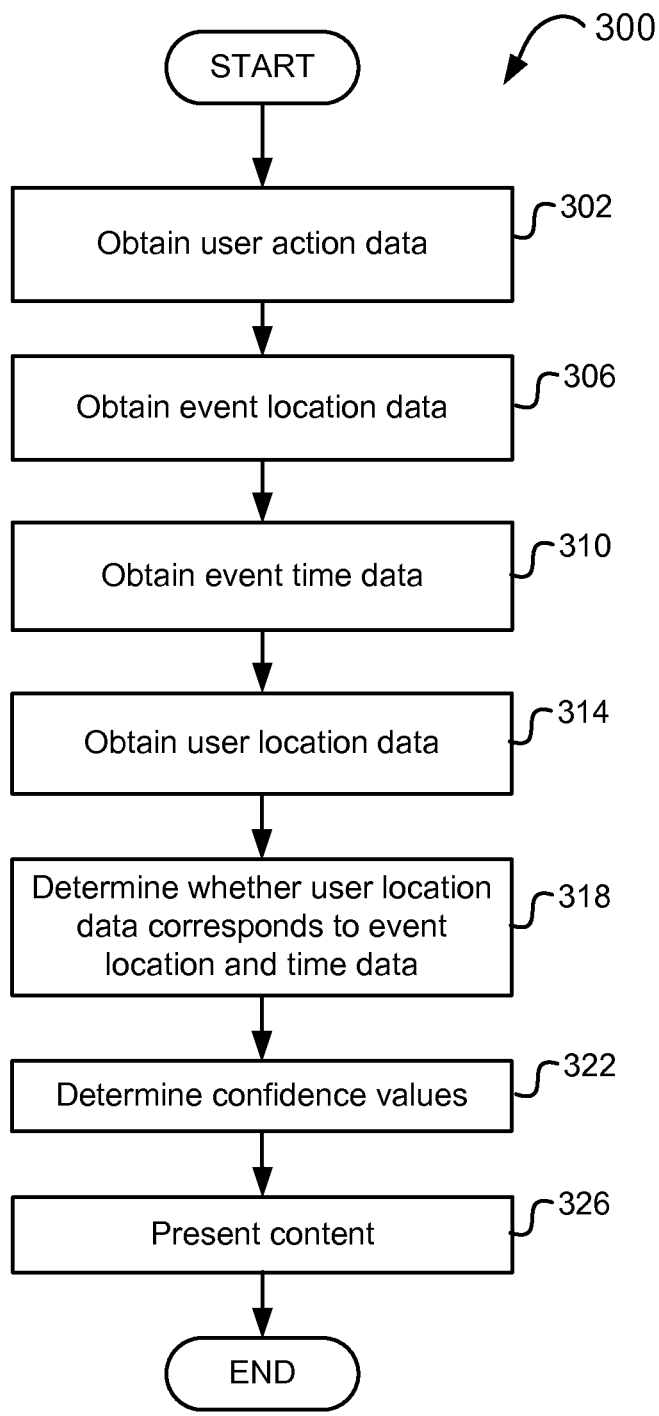
FIG. 3 provides a flow diagram illustrating a process whereby the system of FIG. 2 is used to determine whether a user attends an event and to serve selected content to the user, in accordance with at least one embodiment.

FIG. 3 provides a flow diagram illustrating a process 300 whereby the attendance determination system 210 is used to determine the likelihood that a user attends an event and, if attendance is likely, to serve to the user content related to the event, in accordance with at least one embodiment. According to some embodiments, the user may be an individual consumer and the event may be a recorded or live performance, fashion show, photo shoot, tour, festival, fair, convention, or any other type of event. It should be appreciated that embodiments are not limited to individual users and that some embodiments determine the attendance of entities, such as groups, bands, performance groups, news and entertainment media, etc.

Referring to FIG. 3, as represented by block 302, according to some embodiments, the attendance determination system 210 obtains data related to a user action. As mentioned above, the user action may be interaction between a user and a website or application that involves content related to an event. For example, user action data may include a description of the user action (e.g., view show times, read or write reviews, purchase related items, etc.) and the corresponding time at which the user action occurred. As represented at block 306, the attendance determination system 210 obtains event location data for the event associated with the user action. As represented at block 310, the attendance determination system 210 obtains event time data associated with the locations identified at block 306. For example, the attendance determination system 210 obtains location information for the location where the event occurred, is occurring, or will occur as well as date and time information for when the event occurred, is occurring, or will occur.

According to an embodiment, when executing the steps represented at blocks 306 and 310, the attendance determination system 210 obtains a reference (e.g., event title) for the event in question and searches the event data 256 for the reference. After locating the reference and the associated data, the attendance determination system 210 obtains location information, such as GPS coordinates, of the one or more venues where the event occurred, is occurring, or will occur and corresponding times-of-occurrence for the event at the various venues. For example, if the event was a movie having a show time later in the day/evening, the attendance determination system 210 would obtain the movie title, search the event data 256 for the title, and then obtain from the event data 256 the location information of the theaters where the movie is being shown as well as the corresponding show times.

According to an embodiment, the attendance determination system 210 obtains location data for the user. For example, in some embodiments, the attendance determination system 210 accesses the user data 254 and searches for the unique identification associated with the user. Upon locating the unique identification and the data associated therewith, the attendance determination system 210 obtains location information obtained from the mobile device 216 associated with the user. For example, the location information may also include the associated timestamp, which provides the date and time the mobile device 216 was located at the corresponding location. According to some embodiments, rather than obtaining all or a large amount of location information, the attendance determination system 210 obtains location information for a time period that is close to the time of the user action. For example, the attendance determination system 210 obtains location information for a time period one day prior to the user action through one day after the user action. However, in some instances, the attendance determination system 210 will query the user data 254 for user location information shortly after the user interaction with the website. Accordingly, one day of post user action location data is not available in those instances. It should be appreciated that the attendance determination system 210 can obtain data from any time period prior to the user action through any time period after the user action.

After obtaining location and time-of-occurrence data for the event and for the user, the attendance determination system 210, according to block 318, reviews the location and time information of the event and of the user to determine whether the user is located near the event within a certain period of time of the event. It should be appreciated that, because retrieving location data for every event in the database and then matching that location data against all the location data for each user would be computationally expensive, retrieval of location data could be limited to predefined clusters of events and users. For example, location data could be retrieved for predefined locations of interest that contain events known to be of interest to certain users. It should also be appreciated that the likelihood that the user attended an invent increases if the location data associated with the user indicates the user was at the location of the event during the time-of-occurrence of the event, whereas the likelihood decreases if the location data associated with the user indicates that the user was at the location of the event but the user was at the location before or after the time-of-occurrence. For example, if the user is near the location of the event five minutes before or after the event, then there is a reasonably high likelihood that the user attended. However, if the user is near the location of the event five hours before or after the event, then there is a reasonably low likelihood that the user attended. Further, the likelihood that a user will attend an event increases if the user is one of multiple people who are located near each other and near the location of the event, and who are executing the same user action, such as reviewing the show time of a movie. For example, the likelihood that a user will attend a particular movie increases if the user is one of multiple users located at a café, which is near a movie theater, and accessing show times for the movie from their mobile devices.

According to an embodiment, the attendance determination system 210 is configured to determine whether the user will likely attend the event, is likely attending the event, or likely attended the event. For example, if the attendance determination system 210, based on the obtained data, identifies that the user is located near the event just before the start of the event, the system 210 may conclude that the user will likely attend the event. If the user is likely at the event, the attendance determination system 210, based on the obtained data, determines that the user is at the event while the event is occurring. Further, if the user likely attended the event, the attendance determination system 210, based on the obtained data, determines that the user was at the event during the time when the event occurred.

Figure 4:
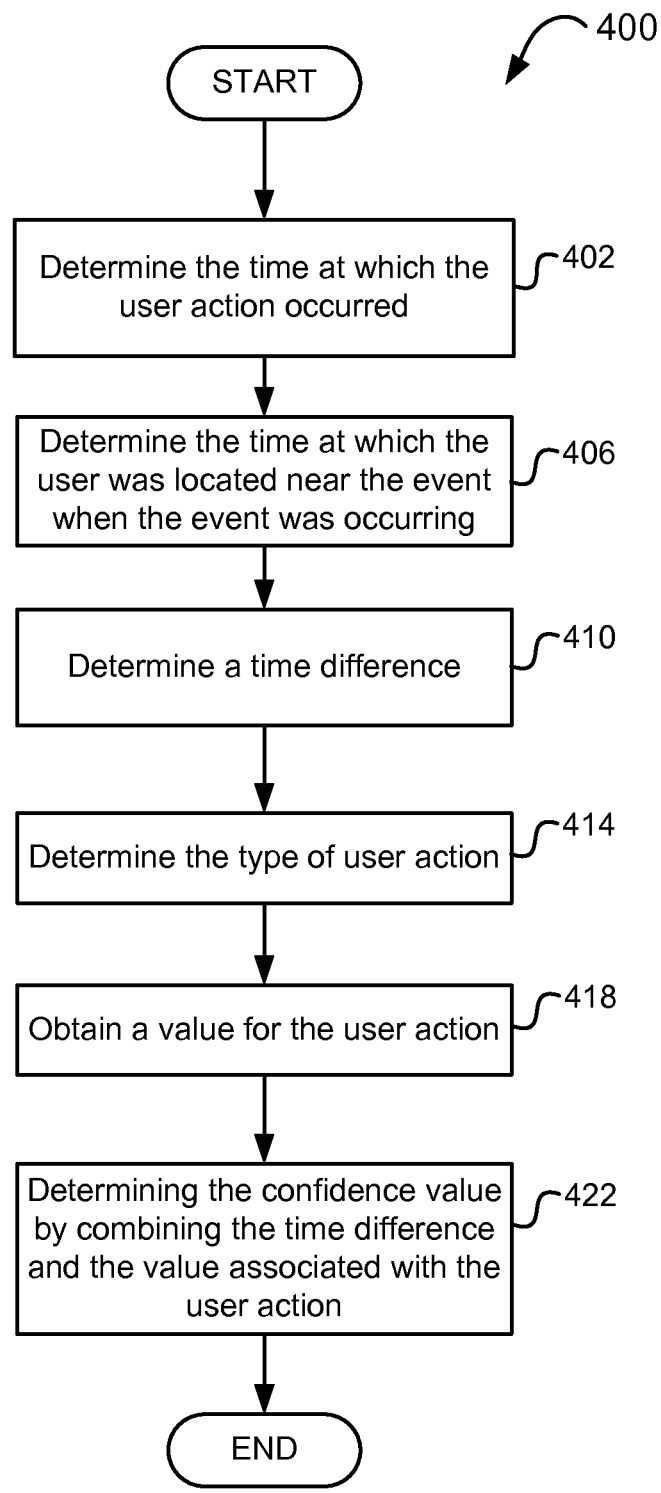
FIG. 4 provides a flow diagram illustrating a process whereby the system of FIG. 2 is used to determine confidence values indicative of whether a user attends an event, in accordance with at least one embodiment.

Next, as indicated at block 322, the attendance determination system 210 determines confidence values and applies the confidence values to determine the likelihood that the conclusion determined by the system is correct (e.g., going to attend, is attending, attended). FIG. 4 provides a flow diagram illustrating a process 400 whereby the attendance determination system 210 determines a confidence value associated with a determination that a user will attend an event, is attending an event, or already attended an event, in accordance with at least one embodiment. As indicated at block 402, the attendance determination system 210 obtains the time at which the user action occurred. As mentioned above, the user action may be user interaction with a website or application that provides content related to the event. According to an embodiment, the user data 254 includes the time the user action occurred. Accordingly, to obtain the time at which the user action occurred, the attendance determination system 210 accesses the user data 254 and searches for the unique identification associated with the user. Upon locating the unique identification and the data associated therewith, the attendance determination system 210 obtains the user action data associated with the event in question. It should be appreciated that data mining techniques, such as association rules or Markov chains could also be employed to obtain the relevant data.

As indicated at block 406, the attendance determination system 210 obtains the time at which the user was at a location at or near the event close to the time-of-occurrence of the event. To do so, according to an embodiment, the attendance determination system 210 accesses the user data 254 and searches for the unique identification associated with the user. Upon locating the unique identification and the data associated therewith, the attendance determination system 210 obtains location information obtained from the mobile device 216 for a period of time near the event. For example, the attendance determination system 210 may obtain such location information from a log or database of location information related to the mobile device 216. For example, the location information may also include the associated timestamp, which provides the date and time the mobile device 216 was located at the corresponding location.

As indicated at block 410, the attendance determination system 210 determines a time difference between the time the user action occurred and the time the user was near the location of the event. As indicated at block 414, the attendance determination system 414 then determines the type of user action that occurred. According to an embodiment, information related to the type of user action is stored in the user data 254 and is associated with the user action. For example, as mentioned above, the user action may be interaction between a user and a website or application that involves content related to an event. For example, the type of user action may be viewing show times, reading review, writing reviews, purchasing tickets, and purchasing merchandise related to the event.

It should be appreciated that step of determining the type of user action, which is represented at block 414, may occur in conjunction with or immediately after the step of determining the time at which the user action occurred, which is represented at block 402, because considering both the time of the user action and type of the user action may indicate something about the user's intentions. For example, a user action of reading a review of a new movie in the morning may indicate that user is going to attend the movie later that day, whereas reading a movie review at the end of the day may indicate the user already attended the movie and just wants to see what others thought.

As indicated at block 418, the attendance determination system 210 obtains a value for the user action. According to an embodiment, the value is included in the user data 254 and is associated with the user action. For example, user actions of reading reviews and purchasing merchandise may have relatively low values, whereas user actions of purchasing tickets, viewing show times, and writing reviews may have higher values because these user actions indicate higher commitment by the user to attend the event. As indicated at block 422, after obtaining values that represent the time difference and the user action, the attendance determination system 210 determines the confidence value by combining normalized values that represent the time difference and the user action. Larger confidence values reflect higher likelihoods of attendance, whereas smaller confidence values reflect lower likelihoods of attendance. Smaller time differences result in larger confidence values, whereas larger time differences result in smaller the confidence values because, for example, users are more likely to forget about the event, change their plans, or encounter a scheduling conflict as more time lapses between their user action involving the event and the time of the event. Similarly, larger values for user actions result in larger confidence values, whereas smaller values for user actions result in smaller confidence values. It should be appreciated that the optimal confidence values could be learned over time using training/test machine learning techniques.

According to an embodiment, the confidence value associated with a user action may be adjusted up if the user is a member of a group of users that expressed interest in an event via a user action having a moderate to low confidence value and that are located near the event at the time-of-occurrence. As an example, for a group of users whose user actions have low confidence values, the attendance determination system 210 may adjust up the confidence values for at least some of these users if a threshold number of the users of the group are located near the location of the event or near a user that has a high confidence value during the time of the event. For example, the user actions of these users may have low confidence values because the user actions occurred more than one day prior to the time-of-occurrence of the event. In operation, if the attendance determination system 210 determines that a threshold number of these users are located near the event or near a user that has a high confidence value during the time-of-occurrence of the event, then the attendance determination system 210 increases the confidence values associated with those users and serves content to those users in light of the higher confidence value. On the other hand, if the threshold number is not met (i.e., not enough users are near the event or near a user having a high confidence value during the time-of-occurrence), then the attendance determination system 210 will not adjust up the confidence values, even for those users of the group that were located near the event or near a user having a high confidence value.

Figure 5:
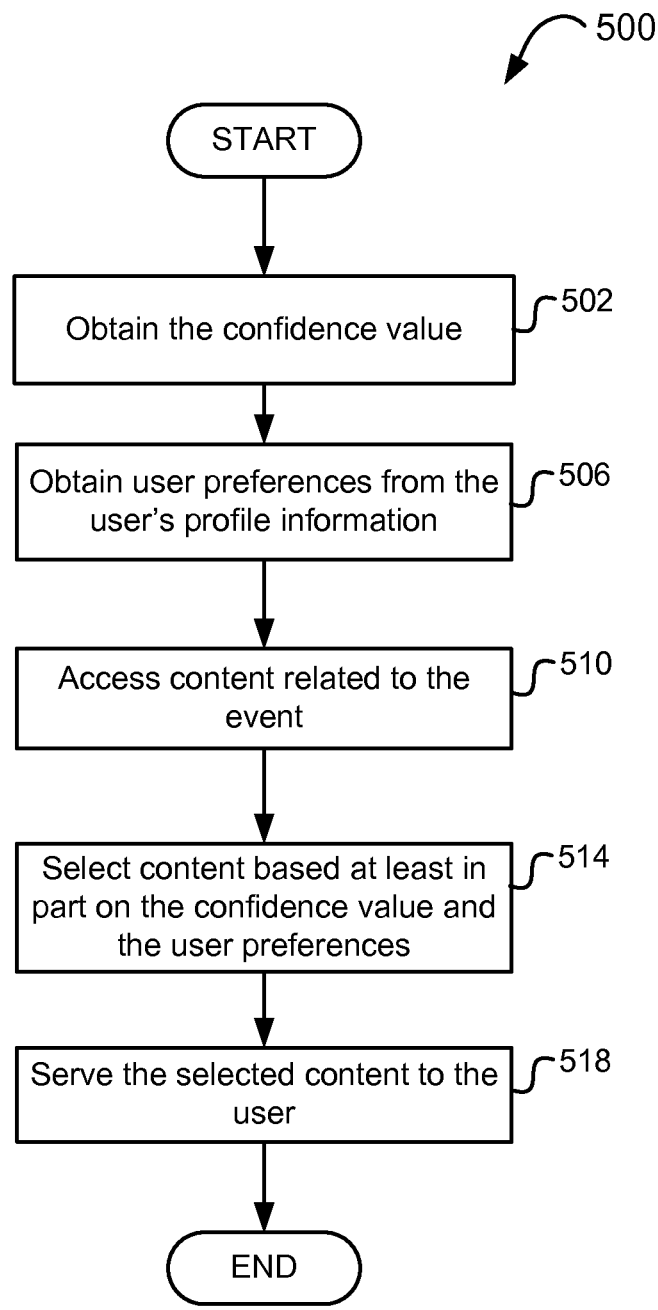
FIG. 5 provides a flow diagram illustrating a process whereby the system of FIG. 2 is used to select and serve content to a user based on whether a user likely attends an event, in accordance with at least one embodiment.

Referring again the FIG. 3, after determining the confidence value, the attendance determination system 210 obtains and serves related content to the user, at block 326. FIG. 5 provides a flow diagram illustrating a process 500 whereby the system of FIG. 2 is used to select and serve content to a user based at least in part on the confidence value associated with a user action, in accordance with at least one embodiment. As indicated at block 502, the attendance determination system 210 obtains the confidence value, which was calculated according to process 400. Next, according to the illustrated embodiment, the attendance determination system 210 accesses the user data 254 to obtain user preferences from the user's profile information. These user preferences, for example, may indicate types of content that the user prefers. For example, the user preferences may specify the user's preferred movie critic from which the user obtains movie reviews, preferred chat forums and discussion boards, preferred merchants from which the user buys related merchandise and tickets, preferred theaters, etc. According to an embodiment, these preferences may also influence the confidence values. For example, if a user is near a preferred theater, then the user is more likely to attend an event there.

Next, as indicated at step 510, the attendance determination system 210 accesses the related content data 258, which comprises content that is related to the event that was indicated by the user action. According to an embodiment, the attendance determination system 210 searches the related content data 258 for content related to event and to the user's preferences. However, it should be appreciated that the attendance determination system 210 searches for content that is related to the event, without regard to the user's preferences. Upon identifying related content, the attendance determination system 210 selects content from among the identified related content, according to step 514. According to an embodiment, the attendance determination system 210 selects the content based at least in part on the confidence value associated with the user action. Further, for example, the attendance determination system selects content based on whether the user is likely going to attend an event that is about to start, is likely currently attending an event, or has likely already attended an event.

According to an embodiment, the higher the confidence value, then the more likely the user will attend, is attending, or did attend an event. Accordingly, the higher the confidence value, then the more presumptuous the content may be. For example, if the confidence value is high and the time-of-occurrence of the event indicates that the user has likely already attended an event, the attendance determination system 210 may select content that invites the user to provide a review of the event and to join a discussion about the event with others who went to the event. However, if the time-of-occurrence of the event indicates that the user has likely already attended the event but the confidence value is low, the attendance determination system 210 may select less presumptuous content, such as content that includes links to websites that provide reviews and other information about the event, that provides information about related events, or that offer related items for sale.

Further, for example, if the confidence value is high and the time-of-occurrence of the event indicates the user will likely attend an event that is about to start or that the user is currently attending an event, the attendance determination system 210 may select content that invites the user to purchase tickets for the event, that provides trivia and other information that may enrich the user's experience at the event, and that provides information about the venue (e.g., length of lines, parking information, traffic updates, etc.). However, if the time-of-occurrence of the event indicates that the user is likely about to attend or is currently attending the event but the confidence value is low, the attendance determination system 210 may select less presumptuous content, such as content that includes links to websites that provide theater locations and show times as well as reviews and other information about the event.

Next, as indicated at step 518, after selecting content, the attendance determination system 210 serves the selected content to the user. According to an embodiment, the attendance determination system 210 sends the selected content to an application running on the mobile device 216 or the personal computer 214 associated with the user. Further, according to an embodiment, the attendance determination system serves the content to a website that the user accesses via the mobile device 216 or the personal computer 214.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser.

It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions:
receiving, via a user interface, event data representative of a type of user action taken by a user with respect to electronic information associated with an event, the event being a scheduled performance with at least one time-of-occurrence and at least one location;
in response to receiving the event data, obtaining, by a processing apparatus, location data, indicating at least one location associated with the event, and timing data, indicating the at least one time-of-occurrence of the event at the at least one location;
obtaining, by the processing apparatus, global positioning system (GPS) data indicating a location of at least one device associated with the user within a specified time of the at least one time-of-occurrence of the event;
determining, by the processing apparatus, whether a current location of the at least one device of the user is within a specified distance of the at least one location of the event within the specified time of the at least one time-of-occurrence; and
serving to the user, via the user interface, content that relates to the event.

2. The computer-implemented method of claim 1, further comprising:
determining a time difference between a time at which the user action taken by the user with respect to electronic information occurred and a time at which the location of the at least one device of the user is within the specified distance of the location of the event during the at least one time-of-occurrence.

3. The computer-implemented method of claim 2, further comprising:
determining a confidence value representative of a likelihood of the user's attendance at the event based at least in part on the time difference and the type of user action.

4. The computer-implemented method of claim 3, wherein the confidence value is indirectly proportional to the time difference.

5. The computer-implemented method of claim 3, wherein the confidence value is based at least in part on profile information of the user.

6. A computer-implemented method, comprising:
under the control of one or more computer systems configured with executable instructions:
obtaining, via a user interface, data representative of a type of user action taken by a user with respect to electronic information associated with an event, the event being a scheduled performance with at least one time-of-occurrence and at least one location;

obtaining, by a processing apparatus, data that indicates at least one location of the event and the at least one time-of-occurrence of the event at the at least one location;

obtaining, by the processing apparatus, location data that indicates at least one location of the user within a specified time of the at least one time-of-occurrence of the event;

determining, by the processing apparatus, whether the at least one location of the user during the specified time is within a specified distance of the at least one location of the event; and providing to the user, via the user interface, content that relates to the event.

7. The computer-implemented method of claim 6, wherein the data that indicates the at least one location of the user is global positioning system (GPS) data that indicates at least one location of at least one device associated with the user.

8. The computer-implemented method of claim 6, further comprising:

determining a time difference between a time at which the user action taken by the user with respect to electronic information associated with the event occurred and a time at which the at least one location of the user is within the specified distance of the at least one location of the event; and determining a confidence value representative of the likelihood of attendance of the user at the event based at least in part on the time difference and the type of user action.

9. The computer-implemented method of claim 8, wherein the confidence value is indirectly related to the time difference.

10. The computer-implemented method of claim 8, wherein the confidence value is based at least in part on profile information of the user.

11. The computer-implemented method of claim 8, wherein the confidence value is a high-confidence value if:

the event is a recorded or live performance;

the type of user action is accessing a webpage that presents at least a show time and corresponding location for the recorded or live performance; and the time difference is less than a threshold.

12. The computer-implemented method of claim 11, wherein the confidence value is a medium-confidence value if the time difference is greater than the threshold but less than a second, higher threshold.

13. The computer-implemented method of claim 11, wherein the confidence value is a medium-confidence value if the type of user action is accessing a webpage that presents a review or synopsis of the event and the time difference is less than the threshold.

14. The computer-implemented method of claim 11, wherein the confidence value is a high-confidence value if the type of user action is publishing a comment or review about the event and the time difference is less than a week.

15. The computer-implemented method of claim 6, wherein the content is a prompt for the user to provide a rating or review of the event.

16. The computer-implemented method of claim 6, wherein the content is a prompt for the user to access reviews provided by a plurality of other users who attended the event.

17. The computer-implemented method of claim 6, further comprising:

obtaining, by a user interface, data related to types of user actions taken by a plurality of other users with respect to electronic information associated with the event;

for each of the other users, obtaining, by a processing apparatus, location data that indicates at least one location of the other user during the at least one time-of-occurrence of the event;

identifying, by the processing apparatus, ones of the other users for which the at least one location of the other user corresponds to the at least one location of the user during the at least one time-of-occurrence of the event; and serving to the identified ones of the other users, by the user interface, the content that relates to the event.

18. A computer-implemented method, comprising:

under the control of one or more computer systems configured with executable instructions:

obtaining, via a user interface, data representative of a type of user action taken by a user with respect to electronic information associated with an event, the event being a scheduled performance with at least one time-of-occurrence and at least one location;

obtaining, by a processing apparatus, data that indicates at least one location of the event and the at least one time-of-occurrence of the event at the at least one location;

determining, by the processing apparatus, at least one location of the user within a specified time including the at least one time-of-occurrence of the event;

determining, by the processing apparatus, a time difference between:

a time at which the user action taken by the user with respect to electronic information occurred; and a time at which the at least one location of the user is within a specified distance of the at least one location of the event; and determining, by the processing apparatus, a confidence value representative of a likelihood of attendance of the user at the event based at least in part on the time difference and the type of user action; and causing content relating to the event to be provided, via the user interface, to the user.

19. A computer program product embedded in a non-transitory computer-readable medium for determining the likelihood of a user's attendance, comprising:

program code for obtaining data representative of a type of user action taken by a user with respect to electronic information associated with an event, the event being a scheduled performance with at least one starting time and at least one location;

program code for obtaining data that indicates at least one location of the event and the at least one starting time of the scheduled performance at the at least one location;

program code for obtaining location data that indicates at least one location of the user within a specified time of the at least one starting time of the scheduled performance;

program code for determining whether the at least one location of the user during the specified time is within a specified distance of the at least one location of the event; and program code for providing to the user content that relates to the event.

20. The computer-program product of claim 19, further comprising:

program code for determining a time difference between a time at which the user action taken by the user with respect to electronic information occurred and a time at which the at least one location of the user is within the specified distance of the at least one location of the event during the at least one time-of-occurrence.

21. The computer-program product of claim 20, further comprising:
- program code for determining a confidence value representative of a likelihood attendance of the user at the event based at least in part on the time difference and the type of user action.

22. A system comprising:
- a processor; and
- a memory device including instructions that, when executed by the processor, cause the processor to:
- obtain, via a user interface, data representative of a type of user action taken by a user with respect to electronic information associated with an event, the event being a scheduled performance with at least one starting time and at least one location;
- obtain, by a processing apparatus, data that indicates at least one location of the event and the at least starting time of the scheduled performance at the at least one location;
- obtain, by the processing apparatus, location data that indicates at least one location of the user within a specified time of the at least one starting time of the scheduled performance;
- determine, by the processing apparatus, whether the at least one location of the user within the specified time is within a specified distance of the at least one location of the event; and
- provide to the user, via the user interface, content that relates to the event.

\* \* \* \* \*